United States Patent [19]
Klug et al.

[11] Patent Number: 5,178,670
[45] Date of Patent: Jan. 12, 1993

[54] COLOR FORMER

[75] Inventors: Günther Klug, Monheim; Horst Berneth, Leverkusen; Gert Jabs, Odenthal, all of Fed. Rep. of Germany

[73] Assignee: Bayer Aktiengesellschaft, Leverkusen, Fed. Rep. of Germany

[21] Appl. No.: 675,343

[22] Filed: Mar. 25, 1991

[30] Foreign Application Priority Data
Apr. 3, 1990 [DE] Fed. Rep. of Germany ....... 4010641

[51] Int. Cl.[5] ............................................. C09D 11/00
[52] U.S. Cl. ................................... 106/21 R; 503/218; 503/221
[58] Field of Search .................... 106/21; 503/218, 221

[56] References Cited
U.S. PATENT DOCUMENTS

| | | | |
|---|---|---|---|
| 4,017,480 | 12/1991 | Zink | 106/21 |
| 4,180,405 | 12/1979 | Lawton | 106/21 |
| 4,639,271 | 1/1987 | Brunea et al. | 106/21 |
| 4,687,862 | 8/1987 | Obitsu et al. | 503/221 |
| 4,717,423 | 1/1988 | Dyllick-Brenzinger et al. | 106/21 |
| 5,092,925 | 3/1992 | Berneth et al. | 503/218 |

*Primary Examiner*—Mark L. Bell
*Assistant Examiner*—Helene Klemanski
*Attorney, Agent, or Firm*—Sprung Horn Kramer & Woods

[57] ABSTRACT

A color former for pressure- and heat-sensitive recording systems containing
a) at least one 3,1-benzoxazine of the formula

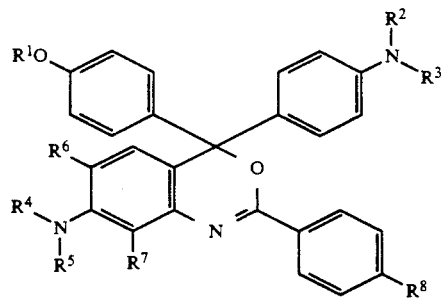

b) at least one fluoran of the formula

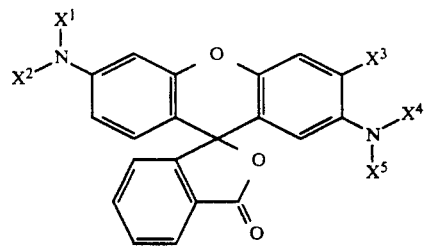

c) at least one 3,1-benzoxazine of the formula

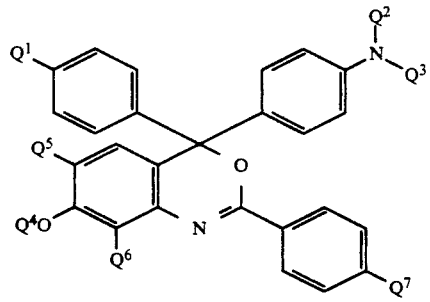

and/or at least one lactone of the formula

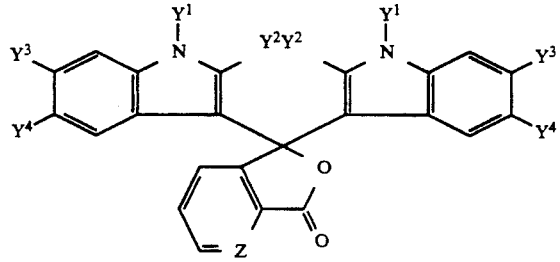

in which the substituents have the meanings given in the description, produces black colorations having good color intensity.

9 Claims, No Drawings

COLOR FORMER 3,1-Benzoxazines (EP-A (European Published Specification) 187,329, DE-A (German Published Specification) 3,622,226), fluorans (Japanese Patent Specification 7,112,312, DE-A (German Published Specification) 2,025,171 and lactones (DE-A (German Published Specification) 2,257,711) are known as colour formers for pressure- and heat-sensitive recording systems. However, not only the developed dyestuff but also the undeveloped microencapsulated colour former frequently do not show fully satisfactory light fastness properties.

It has now been found that colour former mixtures—containing black-developing 3,1-benzoxazines, green-developing fluorans and red-developing lactones and/or 3,1-benzoxazines—have improved light fastness properties.

Accordingly, the invention relates to a colour former mixture for pressure- and heat-sensitive recording systems containing a) at least one 3,1-benzoxazine of the formula

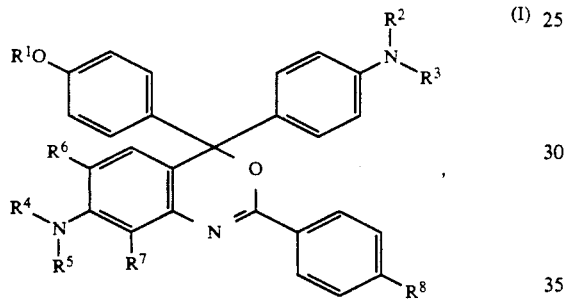

in which $R^1$ to $R^5$, independently of one another are $C_1$-$C_4$-alkyl or benzyl whereby the moiety

additionally can designate piperidino, morpholino, pyrazolino or 3,5,5-trimethylpyrazolino, or one of the radicals $R^6$ or $R^7$ is methyl, ethyl, methoxy, ethoxy or chlorine and the other is hydrogen and $R^8$ is hydrogen, methyl or chlorine, b) at least one fluoran of the formula

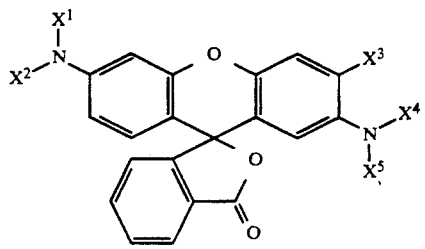

wherein $X^1, X^2, X^4, X^5$, independently of one another, are hydrogen, $C_1$-$C_{12}$-alkyl which may be substituted by $C_1$-$C_3$-alkoxy, cyclohexyl, phenyl or heterocyclic radicals from the series of nonhydrogenated, partially hydrogenated or hydrogenated furans, pyrrols and pyridines, or is allyl, cyclopentyl, cyclohexyl or phenyl which is unsubstituted or substituted by methyl, methoxy or chlorine, whereby the moiety $NX^1X^2$ additionally can designate pyrrolidino, piperidino or morpholino and $X^3$ is hydrogen, methyl, methoxy or chlorine, c) at least one 3,1-benzoxazine of the formula

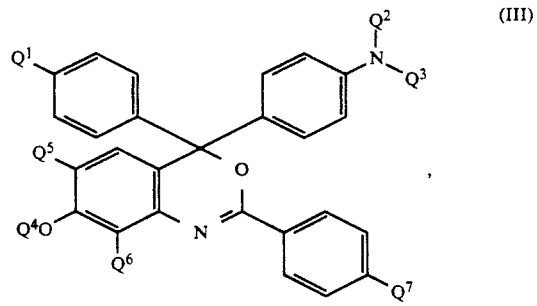

in which $Q^1$ is hydrogen, chlorine, $C_1$-$C_4$-alkyl or $C_1$-$C_4$-alkoxy, $Q^2$ to $Q^4$ independently of one another are $C_1$-$C_4$-alkyl, one of the radicals $Q^5$ or $Q^6$ is methyl, ethyl, methoxy, ethoxy, propoxy, 2-propoxy or chlorine, and the other is hydrogen, and $Q^7$ is hydrogen, methyl or chlorine, and/or d) at least one lactone of the formula

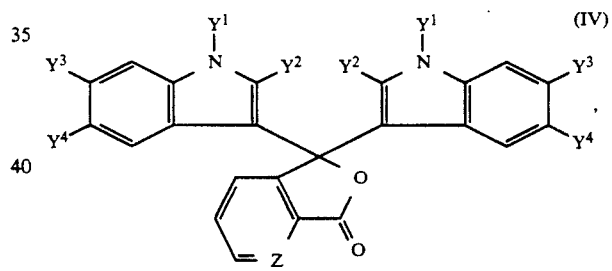

in which $Y^1$ is $C_1$-$C_{12}$-alkyl, benzyl or phenethyl,

Yhu 2 is hydrogen, $C_1$-$C_4$-alkyl or phenyl, $Y^3$ and $Y^4$ independently of one another, are hydrogen, chlorine, methyl or methoxy, and Z is CH or N, and to recording materials containing the abovementioned mixtures as colour formers.

The abovementioned alkyl and alkoxy radicals can be straight-chain or branched.

Preference is given to a mixture of a) 3,1-benzoxazines of the formula (I) in which $R^1$ to $R^5$ independently of one another are methyl or ethyl whereby the moiety $NR^4R^5$ additionally can designate piperidino, one of the radicals $R^6$ or $R^7$ is methyl, methoxy or chlorine and the other is hydrogen and $R^8$ is hydrogen, methyl or chlorine, b) fluorans of the formula (II), in which $X^1, X^2, X^4, X^5$ independently of one another are hydrogen, methyl, ethyl, 1-propyl, 2-propyl, 1-butyl, 2-butyl, 2-methyl-1-propyl, pentyl, 2-pentyl, 3-pentyl, 2-methyl-1-butyl, 3-methyl-1- butyl, 2-ethyl-1-propyl, hexyl, 2-hexyl, 3-hexyl, 4-methyl-1-pentyl, heptyl, 2-heptyl, octyl, 2-octyl, 2-ethyl-1-hexyl, 2-methoxy-ethyl, 2-ethoxy-ethyl, 3-methoxypropyl, 3-ethoxy-propyl, 4-methoxy-butyl, 4-ethoxybutyl, cyclohexylmethyl, benzyl, furfuryl, pyrrolidin-2-yl-methyl, 2-(2- or 4-pyridyl)-ethyl, allyl, cyclopentyl, cyclohexyl, phenyl, 2- or 4-chloro-phenyl, 2- or 4-tolyl, 2- or 4-anisyl whereby the moiety $NX^1X^2$ additionally can designate pyrrolidino, piperidino or morpholino, $X^3$ is hydrogen, methyl or chlorine, and c) 3,1-benzoxazines of the formula (III) in which $Q^1$ is hydrogen, chlorine, methoxy or ethoxy, $Q^2$ to $Q^4$ independently of one another are methyl or ethyl, one of the radicals $Q^5$ or $Q^6$ is methyl, methoxy or chlorine and the other is hydrogen, and $Q^7$ is hydrogen, methyl or chlorine, or lactones of the formula (IV) in which $Y^1$ is methyl, ethyl, 1-propyl, 2-propyl, butyl, 2-butyl, pentyl, 2-pentyl, hexyl, 2-hexyl, heptyl, 2-heptyl, octyl, 2-octyl or benzyl, $Y^2$ is hydrogen, methyl, ethyl, propyl, butyl or phenyl, $Y^3$ and $Y^4$, independently of one another, are hydrogen, chlorine, methyl or methoxy, and Z is CH or N.

Particular preference is given to a mixture of a) 3,1-benzoxazines of the formula (I) in which $R^1$ to $R^5$ independently of one another are methyl or ethyl whereby the moiety $NR^4R^5$ additionally can designate piperidino one of the radicals $R^6$ or $R^7$ is methyl or chlorine and the other is hydrogen, and $R^8$ is hydrogen or chlorine, b) fluorans of the formula (II) in which $X^1$ and $X^2$ independently of one another are hydrogen, methyl, ethyl, 1-propyl, 2-propyl, butyl, 2-methyl-1-propyl, furfuryl, 3-ethoxypropyl, cyclohexyl, benzyl or phenyl whereby the moiety $NX^1X^2$ additionally can designate pyrrolidino or piperidino, $X^3$ is hydrogen or methyl, $X^4$ is hydrogen, methyl, ethyl, propyl, butyl or benzyl, and $X^5$ is methyl, ethyl, propyl, butyl, pentyl, hexyl, heptyl, octyl, benzyl, phenyl, o-tolyl or 2-chlorophenyl, and c) benzoxazines of the formula (III) in which $Q^1$ is hydrogen or methoxy, $Q^2$ to $Q^4$ independently of one another are methyl or ethyl, one of the radicals $Q^5$ or $Q^6$ is methyl or methoxy and the other is hydrogen, and $Q^7$ is hydrogen or chlorine, or lactones of the formula (IV) in which $Y^1$ is methyl, ethyl, propyl, butyl, pentyl, hexyl, heptyl, octyl or benzyl, $Y^2$ is methyl, ethyl or phenyl, $Y^3$ and $Y^4$ are hydrogen and Z is CH.

Very particular preference is given to a mixture of a) at least one 3,1-benzoxazine of the formula

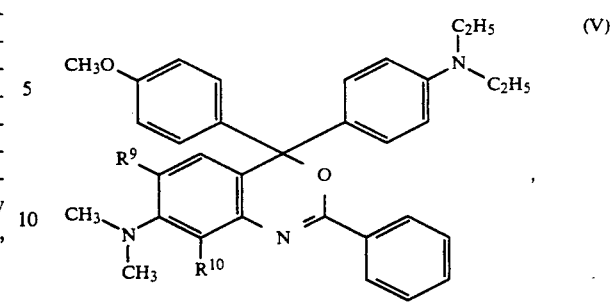

in which $R^9$ is methyl and $R^{10}$ is hydrogen or $R^9$ is hydrogen and $R^{10}$ is methyl, b) at least one fluoran of the formula

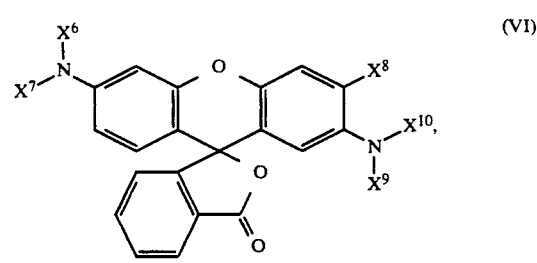

in which $X^6$ is hydrogen, methyl, ethyl, benzyl or phenyl, $X^7$ is methyl, ethyl, propyl, butyl or cyclohexyl whereby the moiety $NX^6X^7$ additionally can designate pyrrolidino $X^8$ is hydrogen or methyl, $X^9$ is hydrogen, methyl, ethyl, benzyl or phenyl, and $X^{10}$ is methyl, ethyl, butyl, octyl or benzyl, and c) at least one 3,1-benzoxazine of the formula

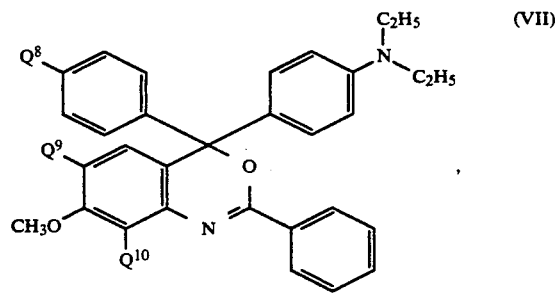

in which $Q^8$ is hydrogen or methoxy, $Q^9$ is methyl or methoxy and $Q^{10}$ is hydrogen or $Q^9$ is hydrogen and $Q^{10}$ is hydrogen or methoxy, or at least one lactone of the formula

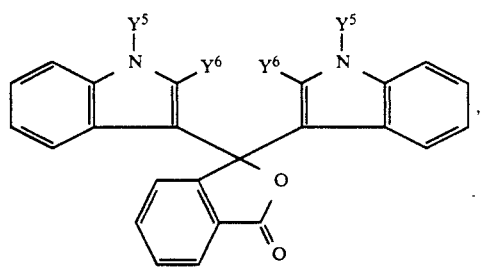

(VIII)

in which

Y⁵ is methyl, ethyl, butyl or octyl and

Y⁶ is methyl or ethyl.

As a rule, for each of the mixtures, a 3,1-benzoxazine of the formula (I), a fluoran of the formula (II) and a 3,1-benzoxazine of the formula (III) and/or a lactone of the formula (IV) are mixed. The mixing ratio of I:II:III or IV, or III+IV is between 5-95/3-70/2-70 parts by weight. Preference is given to mixtures containing 30-90% of (1), 5-50% of (11) and 4-40% of (111) or (IV) (all % are by weight). Particular preference is given to mixtures containing more than 50% of the 3,1-benzoxazine components of the formula (I). If desired, the mixtures can contain further conventional colour formers for heat- and pressure-sensitive recording materials.

The benzoxazine and/or fluoran and/or lactone components can themselves each be mixtures of compounds of the formulae (I), (II), (III) and (IV). Preference is given to mixtures in which at least one of the benzoxazine components of the formulas (I), (III), (V) and (VII) is the mixture of two benzoxazines which are isomers with respect to radicals R⁶ and R⁷ and R⁹ and R¹⁰ or Q⁵ and Q⁶ or Q⁹ and Q¹⁰ for example:

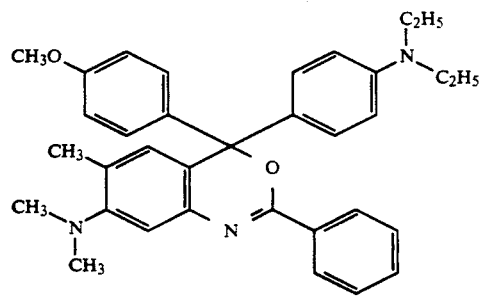

(IX)

and

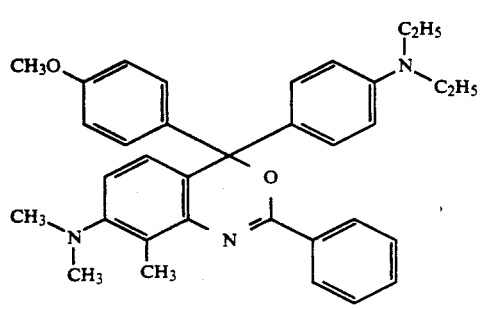

(X)

Isomeric mixtures of this type having a mixing ratio of 99/1 to 1/99, preferably 95/5 to 5/95, particularly preferably 90/10 to 10/90.

Preferred mixtures consist of components a) and b), 3,1-benzoxazines (III) and/or lactones (IV).

The mixtures according to the invention have good colour intensity not only on phenolic substrates but also, in particular, on activated clays. Their development rate is almost independent of the substituents. In general, they are distinguished by a high development rate in combination with reduced sensitivity of the recording materials to unintended premature development.

They reach their developing hue immediately without any undesirable changes in shade taking place during or following their development.

A pressure-sensitive material consists, for example, of at least 1 pair of sheets containing a colour former mixture according to the invention, dissolved or dispersed in a nonvolatile organic solvent, and a developer.

Processes and preparations of this type are disclosed, for example, in U.S. Pat. Nos. 2,800,457, 2,800,458, 2,948,753, 3,096,189 and 3,193,404 and in DE-A (German Published Specification) 2,555,080 and 2,700,937.

To prevent premature activation of the colour formers present in the pressure-sensitive recording materials, they are preferably enclosed in microcapsules which can usually be broken up by applying pressure.

Examples of suitable capsule raw materials are gelatin/gum arabic, polyamides, polyurethanes, polyureas, polysulphonamides, polyesters, polycarbonates, polysulphonates, polyacrylates and phenol-, melamine- or ureaformaldehyde condensation products, such as are described, for example, in M. Gutcho, Capsule Technology and Microencapsulation, Noyes Data Corporation 1972, G. Baster, Microencapsulation, Processes and Applications, edited by J. E. Vandegaar, and in DE-A (German Published Specification) 2,237,545 and 2,119,933.

In the process according to the invention, microcapsules whose envelopes are made of gelatin/gum arabic, polyurethanes, polyureas, polyamides and melamine-formaldehyde condensation products are preferably used. Microcapsules whose envelopes are made of polyaddition products from polyisocyanates with polyamines are very particularly preferred.

Examples of isocyanates to be used for the manufacture of microcapsules of this type are diisocyanates, polyisocyanates, triisocyanates having biuret structure, triisocyanates having isocyanurate structure, polyisocyanates modified by di- or trifunctional alcohols, or other modified isocyanates, for example those of the formula:

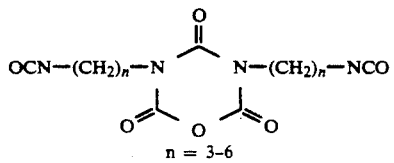

(XI)

n = 3-6

Diamines which are suitable for reaction with the isocyanates mentioned are aliphatic primary or secondary di-, tri- or polyamines and aromatic di-, tri- or polyamines. Isocyanates, amines, solvents and a suitable preparation process for microcapsules of this type are described, for example, in DE-A (German Published Specification) 3,203,059.

Suitable developers are clays, acid-modified clays, oxides or hydrogen salts and monomeric, resin-like or polymeric phenols, carboxylic acids, salicylic acids or metal salts thereof.

Thermoreactive recording systems comprise, for example, heat-sensitive recording and copying materials and papers.

Such a material is described, for example, in DE-A (German Published Specification) 2,555,080.

Suitable developers are the same electron acceptors which are used in pressure-sensitive papers, preferably phenolic compounds, which are described, for example, in DE-A (German Published Specification) 1,251,348, and boric acid and organic, preferably aliphatic, dicarboxylic acids.

A further suitable thermoreactive developer system is described in DE-A (German Published Specification) 3,337,296, in which acid-modified polymers, preferably those of acrylonitrile, act as the developer.

CB papers coated with capsules and containing the mixtures according to the invention of the colour formers dissolved in an organic solvent are brought into contact in the usual manner with commercially available CF papers coated with the abovementioned developers, or, alternatively, capsules containing the mixtures of the colour formers according to the invention dissolved in an organic solvent are applied together with the above-mentioned developers to the top side of a sheet in the usual manner and used as self-contained papers in a copy set in the usual manner. The copy is formed by applying imagewise mechanical pressure to the surface, as a result of which the colour former solution leaving the destroyed capsules are developed on the surface of the CF or SC papers.

To measure the diffuse reflection, for example, a large-size copy is made on the front of a CF paper containing the colour developer by destroying the capsules of a CB paper containing the colour former mixture according to the invention by means of pressure or a large-size print is made on the front of a SC paper by destroying the capsules containing the colour former mixture according to the invention by means of pressure in a mixture with the colour developers.

The intensity of this copy can be determined using conventional optical spectral photometers, such as, for example, an El Repho 44381 from Carl Zeiss. The intensity is given by the height of the absorption value. This value is calculated as follows:

$$\% \text{ Abs.} = \frac{\% \text{ Dif.refl.}_{CF} - \% \text{ dif.refl.}_{copy}}{\% \text{ dif.refl.}_{CF}} \cdot 100,$$

in which:
% Abs. = absorption value, which corresponds to the intensity
% Dif.refl.$_{CF}$ is diffuse reflection of the CF paper
% Dif.refl.$_{copy}$ is the diffuse reflection of the copy To determine the light fastness properties, the copy (CF fading) or the capsule-coated CB or SC side (CB decline) is irradiated with daylight lamps for 48 hours.

The intensity of the exposed copy (CF fading) is determined as above and the shade is compared visually with the original shade.

After exposure of the capsule-coated side of the CB paper or the top side of a SC paper, a copy is produced by applying pressure. Its intensity (CB decline) is determined as above and together with the shade compared analogously with the copy of an unexposed CB or SC paper.

Black copies developed from the colour former mixtures according to the invention have in some cases high intensities, even with CF fading and CB decline, but in particular also have a lower shift of the shade than copies obtained from colour former solutions of equal concentrations of the 3,1-benzoxazine components of the formula (I).

EXAMPLE A

Preparation of a microcapsule dispersion 26 g of 3,5-bis-(6-isocyanato-hexyl)-2H-1,3,5-oxadiazine-2,4,6-(3H,5H)trione are added with stirring to 174 g of a colour-imparting solution containing up to 5% of individual colour formers or the colour former mixture according to the invention in a mixture of diisopropylnaphthaline isomers. This mixture is emulsified with 251 g of 0.5% strength polyvinyl acetate solution (Mowiol 26/88, Hoechst AG) in a rotor/stator disperser in such a manner that the average droplet size of the emulsion is 7 μm. 49 g of a 9% strength diethylenetriamine solution are then added with stirring and heated at 60° C. for 2 hours to give a microcapsule dispersion whose solids content determination yields a weight proportion of 39.8%.

EXAMPLE B

Production of a CB paper 2.1 g of a conventional spacer based on cellulose, for example Arbocell BE 600/30, 2.0 g of a conventional binder, for example a styrene/butadiene latex, and 16.3 g of water are added with stirring to 12.9 g at approximately 40% strength capsule dispersion. This mixture is applied to a base paper (40 g/m$^2$) by means of a 40 μm knife and dried. This gives a CB paper having a coating weight per unit area of about 5.5 g/m$^2$.

EXAMPLE C

Production of a copy

The CB papers produced in Example B are brought into contact in the usual manner with a commercially available CF paper whose receiving layer consists of activated clay (Reacto, from Köhler). The copy is made by printing the letter w 304 times on an area of 4×4 cm$^2$ in as narrow a way as possible using an electric typewriter from Olympia Werke AG, Wilhelmshaven, Type Olympia SGED 52, with minimum impact.

The intensity is calculated from the diffuse reflection of the 4th copy of the set in which sheets 1-3 consist of untreated paper (40 g/m$^2$), sheet 4 of the CB paper produced in Example B and sheet 5 of the commercially available CF paper, using the abovementioned formula.

EXAMPLE D

A copy made according to Example C or a CB paper produced according to Example B is exposed in a box to light emitted by four 18 W neon tubes (Sylvania Luxline ES, daylight de luxe) for 48 hours.

In what follows, the intensities and shades of a few selected colour former mixtures according to the invention and their components and the intensities and colour shifts in CF fading and CB decline are summarised.

Colour former (I):

Isomeric mixture:

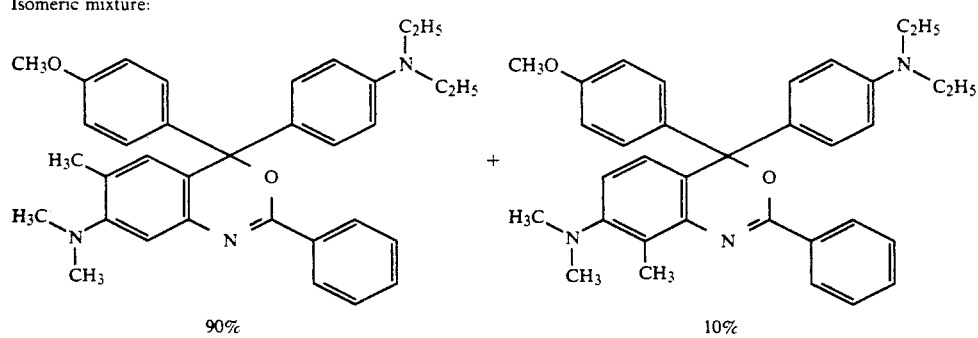

90%      +      10%

Colour former (II):

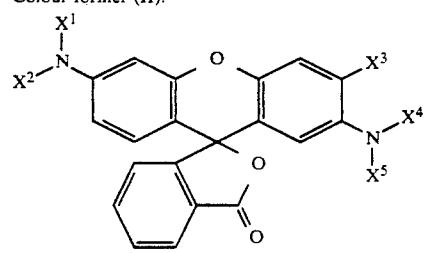

| II | X¹ | X² | X³ | X⁴ | X⁵ |
|---|---|---|---|---|---|
| II/1 | $C_2H_5$ | H | H | $C_6H_5$ | $C_6H_{13}$. |
| II/2 | $C_2H_5$ | $C_2H_5$ | H | $CH_2-C_6H_5$ | $CH_2-C_6H_5$. |
| II/3 | $C_2H_5$ | $C_6H_5$ | $CH_3$ | $CH_3$ | $C_6H_5$. |

Colour former (III):

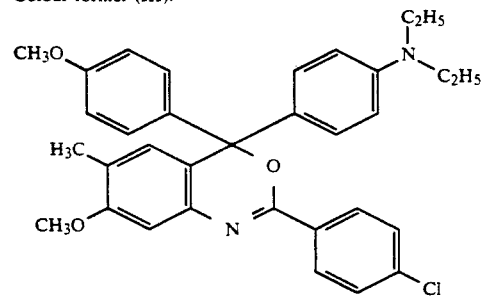

Colour former (IV):

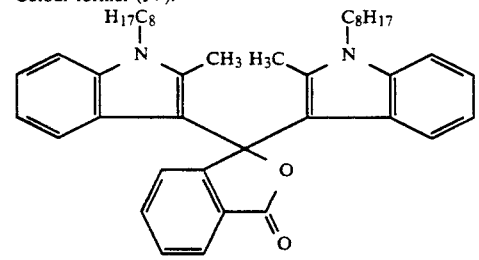

| | | Proportion of colour former (%) | | | | Solvent | Copy | | CF fading | | CB decline | |
|---|---|---|---|---|---|---|---|---|---|---|---|---|
| Ex. | II | I | II | III | IV | a) | Shade | Int. % | Shade | Int. % | Shade | Int. % |
| 1 | — | 100 | — | — | — | KE | bluish-black | 44.7 | green | 37.0 | bluish-black | 36.6 |
| 2 | — | 100 | — | — | — | ME | bluish-black | 45.9 | " | 37.7 | bluish-black | 36.9 |
| 3 | II/1 | 70 | 18 | — | 12 | ME | reddish-black | 47.9 | black | 39.6 | reddish grey | 38.9 |
| 4 | II/1 | 70 | 18 | — | 12 | KE | black | 47.1 | " | 39.3 | grey | 38.7 |
| 5 | II/1 | 70 | 18 | 12 | — | KE | " | 51.9 | greenish black | 43.1 | black | 42.7 |
| 6 | II/1 | 70 | 18 | 12 | — | ME | " | 52.1 | greenish black | 45.1 | " | 43.7 |
| 7 | II/2 | 70 | 18 | — | 12 | ME | " | 50.3 | black | 41.8 | " | 42.0 |
| 8 | II/2 | 70 | 18 | 12 | — | ME | " | 52.8 | greenish | 43.6 | " | 45.5 |

| 9 | II/3 | 70 | 18 | — | 12 | ME | " | 51.4 | black greenish black | 43.4 | reddish black | 41.8 |
| 10 | II/3 | 70 | 18 | 12 | — | ME | " | 52.4 | greenish black | 43.2 | black | 42.5 |
a) ME = chloroparaffin/hydrogenated naphthenes
KE = isomeric mixture of diisopropylnaphthaline/hydrogenated naphthenes
Further suitable mixtures are:
Example 11:
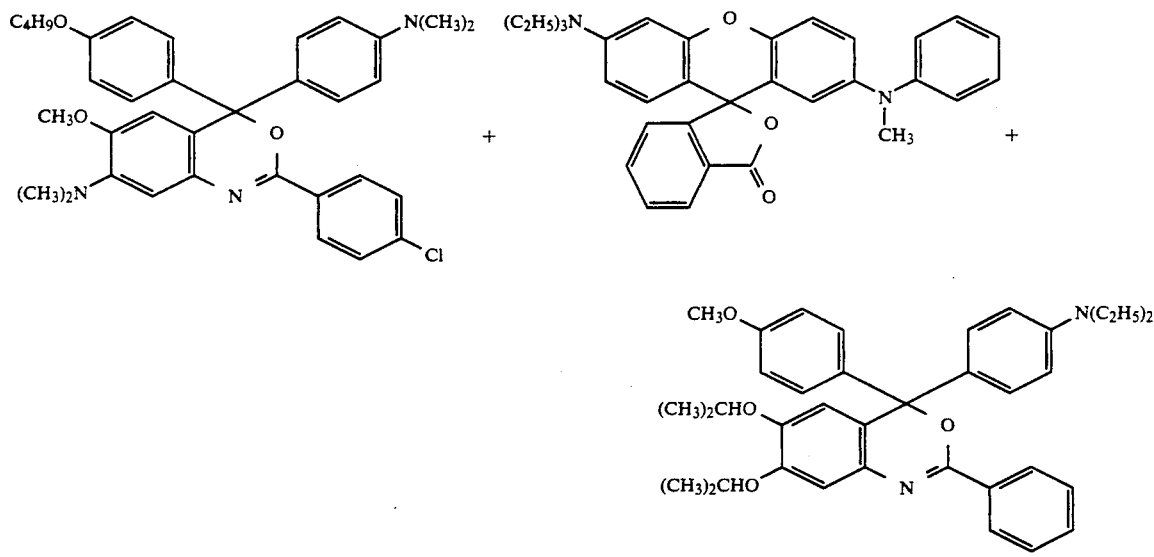
Example 12:
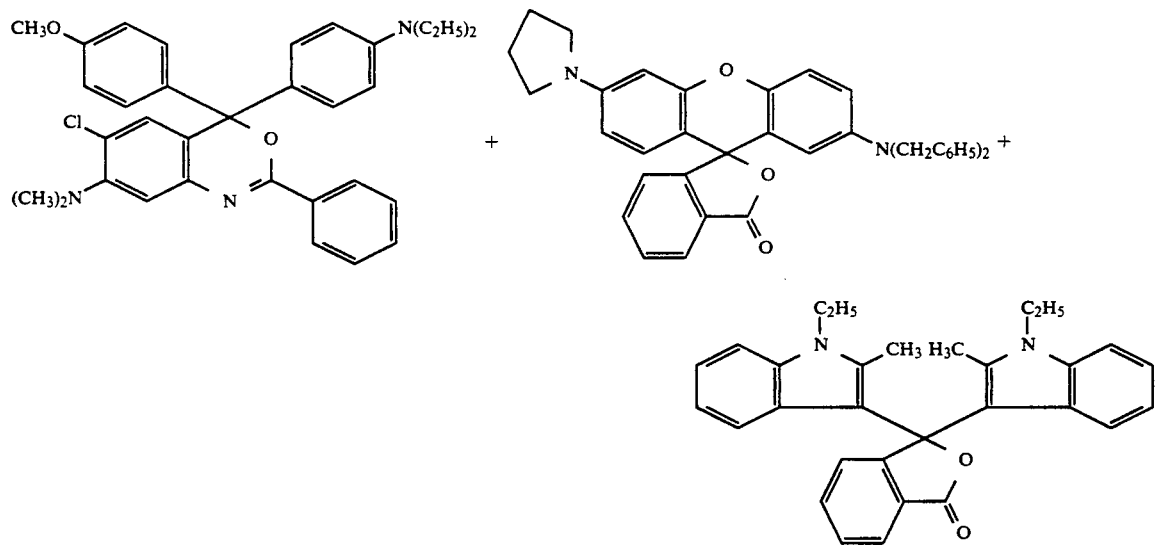
Example 13:
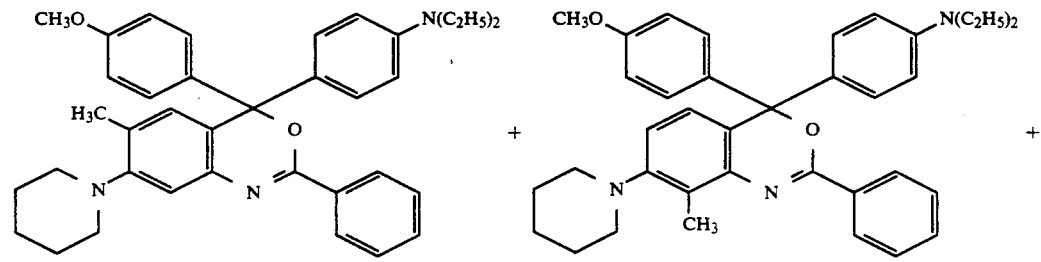

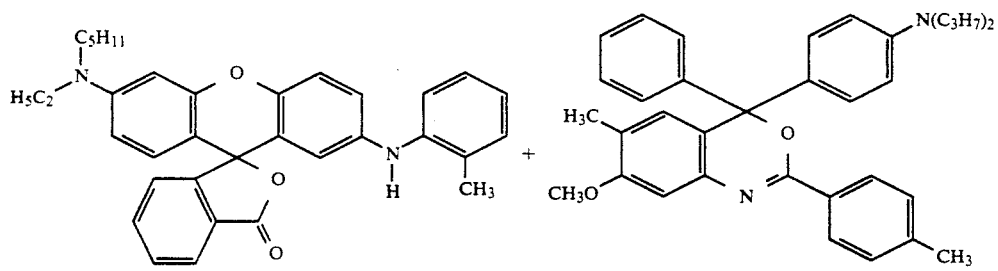
Example 14:
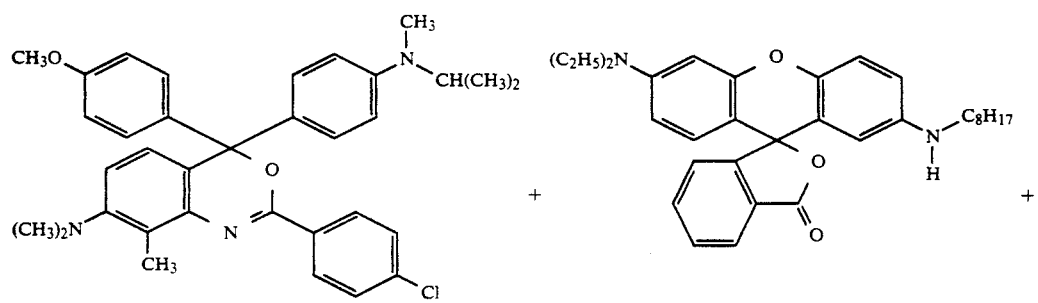
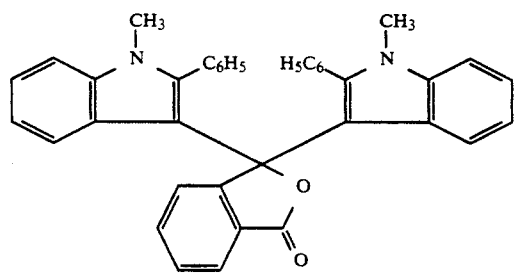
Example 15:
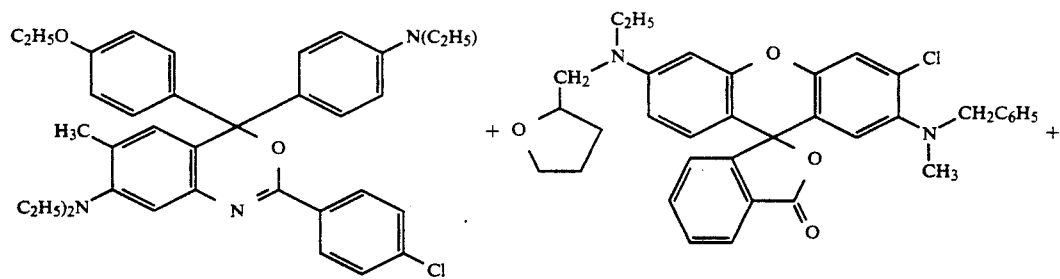
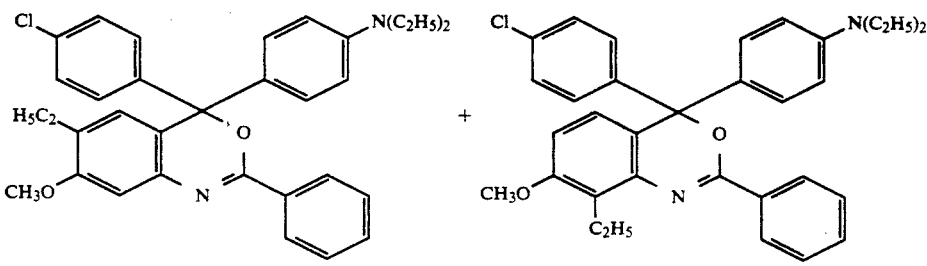
Example 16:

-continued
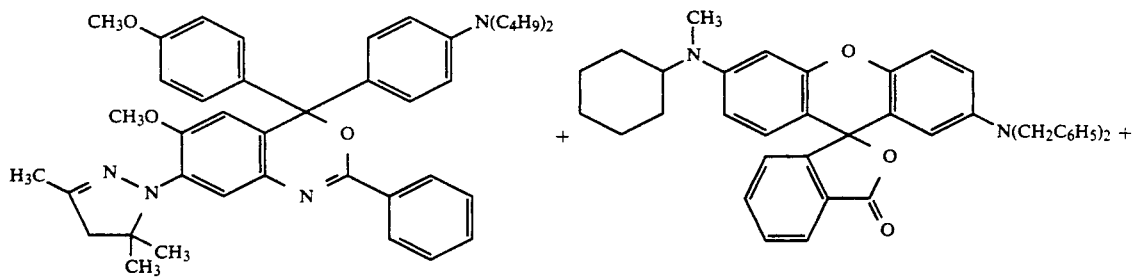
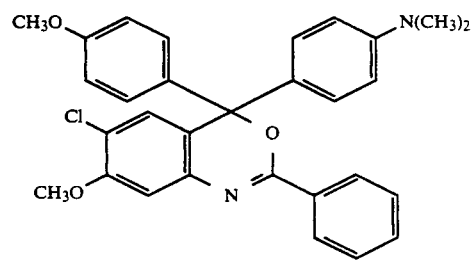
Example 17:
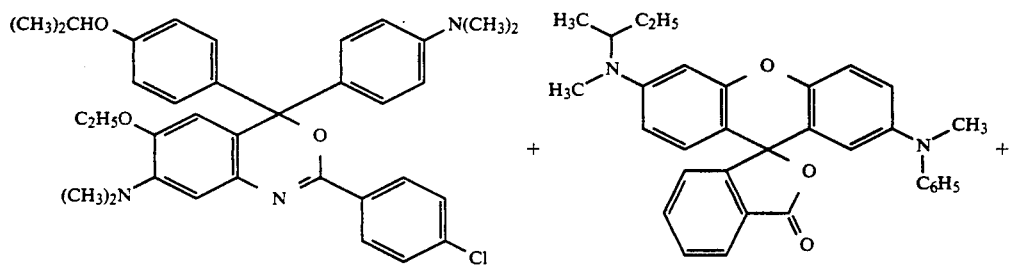
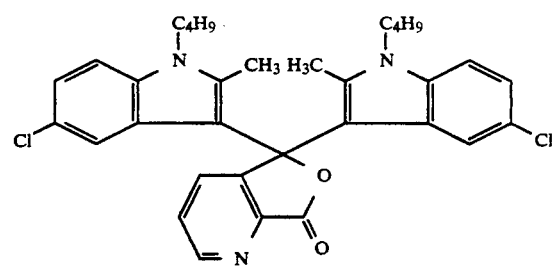
Example 18:
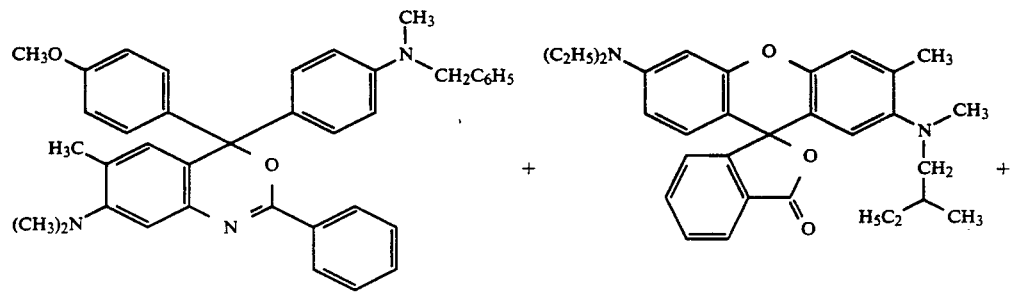

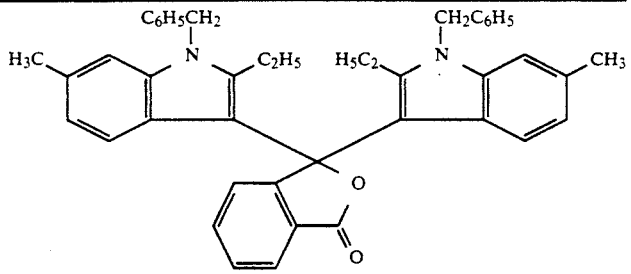

Example 19:

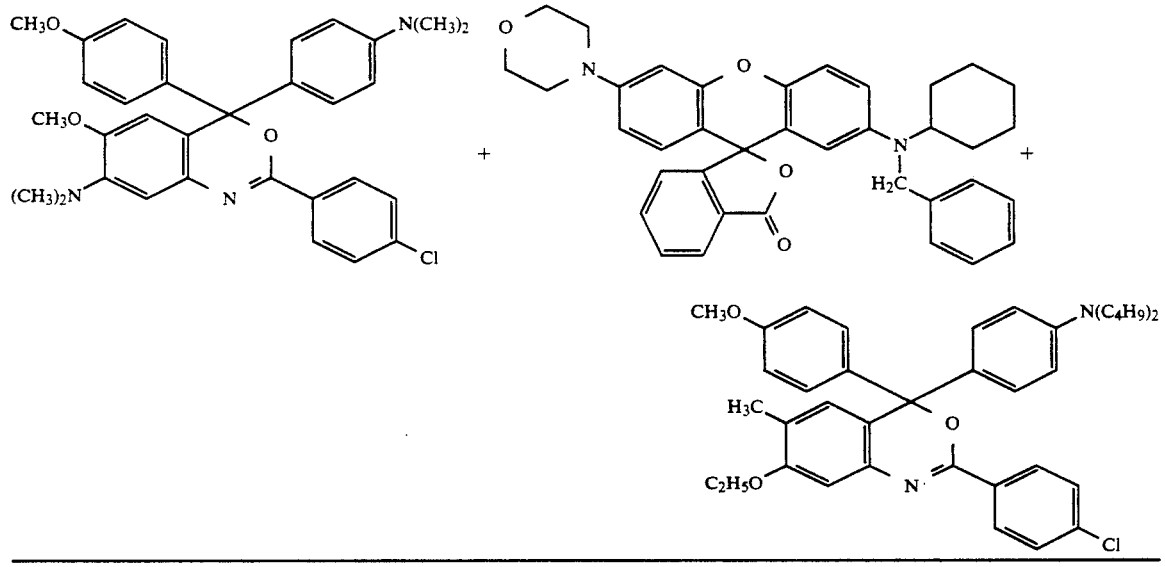

What is claimed is:

1. A colour former mixture for pressure- and heat-sensitive recording systems containing
a) at least one 3,1-benzoxazine of the formula

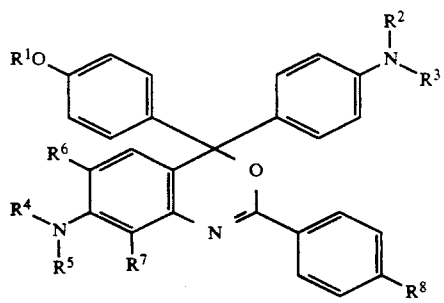

in which
$R^1$ to $R^5$, independently of one another are $C_1$-$C_4$-alkyl or benzyl whereby the moiety

additionally can designate piperidino, morpholino, pyrazolino or 3,5,5-trimethylpyrazolino, one of the radicals $R^6$ and $R^7$ is methyl, ethyl, methoxy, ethoxy or chlorine and the other is hydrogen and $R^8$ is hydrogen, methyl or chlorine;
b) at least one fluoran of the formula

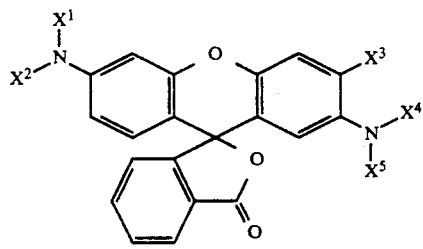

wherein
$X^1, X^2, X^4, X^5$, independently of one another, are hydrogen, $C_1$-$C_{12}$-alkyl which may be substituted by $C_1$-$C_3$-alkoxy, cyclohexyl, phenyl or heterocyclic radicals from the series of nonhydrogenated, partially hydrogenated or hydrogenated furans, pyrrols and pyridines, or is allyl, cyclopentyl, cyclohexyl or phenyl which is unsubstituted or substituted by methyl, methoxy or chlorine, whereby the moiety
$NX^1X^2$ additionally can designate pyrrolidino, piperidino or morpholino and
$X^3$ is hydrogen, methyl, methoxy or chlorine; and at least one compound from c) or d) wherein
c) at least one 3,1-benzoxazine of the formula

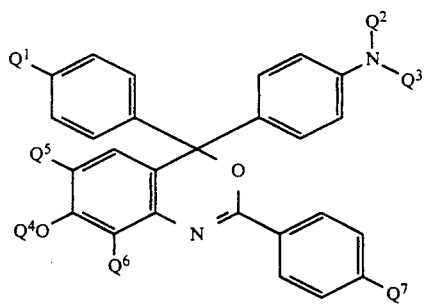

in which
Q¹ is hydrogen, chlorine, $C_1$-$C_4$-alkyl or $C_1$-$C_4$-alkoxy,
Q² to Q⁴, independently of one another are $C_1$-$C_4$-alkyl,
one of the radicals Q⁵ and Q⁶ is methyl, ethyl, methoxy, ethoxy, propoxy, 2-propoxy or chlorine, and the other is hydrogen, and
Q⁷ is hydrogen, methyl or chlorine; and
d) is at least one lactone of the formula

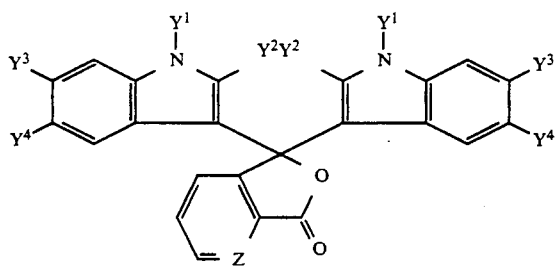

in which
Y¹ is $C_1$-$C_{12}$-alkyl, benzyl or phenethyl,
Y² is hydrogen, $C_1$-$C_4$-alkyl or phenyl,
Y³ and Y⁴, independently of one another, are hydrogen, chlorine, methyl or methoxy, and
Z is CH or N.

2. A mixture of claim 1, in which in the formula given for the 3,1-benzoxazines under a)
R¹ to R⁵ independently of one another are methyl or ethyl whereby the moiety
NR⁴R⁵ additionally can designate piperidino,
one of the radicals R⁶ or R⁷ is methyl, methoxy or chlorine and the other is hydrogen and
R⁸ is hydrogen, methyl or chlorine,
in the formula given for fluorans under b)
X¹,X²,X⁴,X⁵ independently of one another are hydrogen, methyl, ethyl, 1-propyl, 2-propyl, 1-butyl, 2-butyl, 2-methyl-1-propyl, pentyl, 2-pentyl, 3-pentyl, 2-methyl-1-butyl, 3-methyl-1-butyl, 2-ethyl-1-propyl, hexyl, 2-hexyl, 3-hexyl, 4-methyl-1-pentyl, heptyl, 2-heptyl, octyl, 2-octyl, 2-ethyl-1-hexyl, 2-methoxy-ethyl, 2-ethoxy-ethyl, 3-methoxy-propyl, 3-ethoxypropyl, 4-methoxy-butyl, 4-ethoxybutyl, cyclohexylmethyl, benzyl, furfuryl, pyrrolidin-2-yl-methyl, 2-(2- or 4-pyridyl)-ethyl, allyl, cyclopentyl, cyclohexyl, phenyl, 2- or 4-chloro-phenyl, 2- or 4-tolyl, 2- or 4-anisyl whereby the moiety NX¹X² additionally can designate pyrrolidino, piperidino or morpholino,
X³ is hydrogen, methyl or chlorine,
in the formula given for the 3,1-benzoxazines under c)

Q¹ is hydrogen, chlorine, methoxy or ethoxy,
Q² to Q⁴ independently of one another are methyl or ethyl, one of the radicals Q⁵ and Q⁶ is methyl, methoxy or chlorine and the other is hydrogen, and
Q⁷ is hydrogen, methyl or chlorine,
in the formula given for the lactones under d)
Y¹ is methyl, ethyl, 1-propyl, 2-propyl, butyl, 2-butyl, pentyl, 2-pentyl, hexyl, 2-hexyl, heptyl, 2-heptyl, octyl, 2-octyl or benzyl,
Y² is hydrogen, methyl, ethyl, propyl, butyl or phenyl,
Y³ and Y⁴, independently of one another, are hydrogen, chlorine, methyl or methoxy, and
Z is CH or N.

3. A mixture of claim 1, in which in the formula given for the 3,1-benzoxazines under a)
R¹ to R⁵ independently of one another are methyl or ethyl whereby the moiety
NR⁴R⁵ additionally can designate piperidino,
one of the radicals R⁶ or R⁷ is methyl or chlorine and the other is hydrogen, and
R⁸ is hydrogen or chlorine, in the formula given for the fluorans under b)
X¹ and X² independently of one another are hydrogen, methyl, ethyl, propyl, 2-propyl, butyl, 2-methyl-1-propyl, furfuryl, 3-ethoxy-propyl, cyclohexyl, benzyl or phenyl whereby the moiety
NX¹X² additionally can designate pyrrolidino or piperidino,
X³ is hydrogen or methyl,
X⁴ is hydrogen, methyl, ethyl, propyl, butyl or benzyl, and
X⁵ is methyl, ethyl, propyl, butyl, pentyl, hexyl, heptyl, octyl, benzyl, phenyl, o-tolyl or 2-chloro-phenyl,
in the formula given for the 3,1-benzoxazines under c)
Q¹ is hydrogen or methoxy,
Q² to Q⁴ independently of one another are methyl or ethyl,
one of the radicals Q⁵ or Q⁶ is methyl or methoxy and the other is hydrogen, and
Q⁷ is hydrogen or chlorine,
in the formula given for the lactones under d)
Y¹ is methyl, ethyl, propyl, butyl, pentyl, hexyl, heptyl, octyl or benzyl,
Y² is methyl, ethyl or phenyl,
Y³ and Y⁴ are hydrogen and
Z is CH.

4. A mixture of claim 1, which contains a) at least one 3,1-benzoxazine of the formula

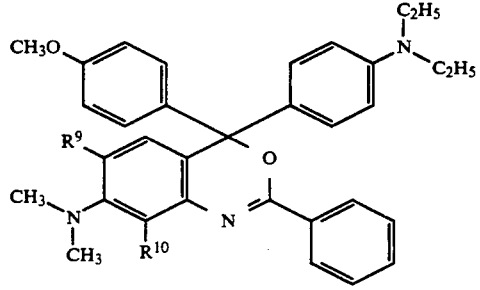

in which
R⁹ is methyl and
R¹⁰ is hydrogen or
R⁹ is hydrogen and $R^{10}$ is methyl;

b) at least one fluoran of the formula

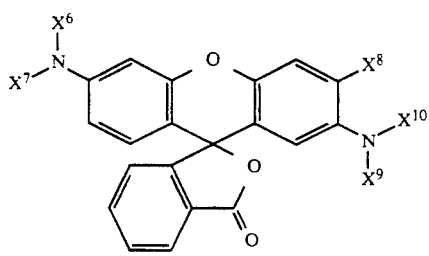

in which
$X^5$ is hydrogen, methyl, ethyl, benzyl or phenyl,
$X^7$ is methyl, ethyl, propyl, butyl or cyclohexyl whereby the moiety
$NX^6X^7$ additionally can designate pyrrolidino,
$X^8$ is hydrogen or methyl,
$X^9$ is hydrogen, methyl, ethyl, benzyl or phenyl, and
$X^{10}$ methyl, ethyl, butyl, octyl or benzyl;

and at least one compound from c) or d) wherein c) is at least one 3,1-benzoxazine of the formula

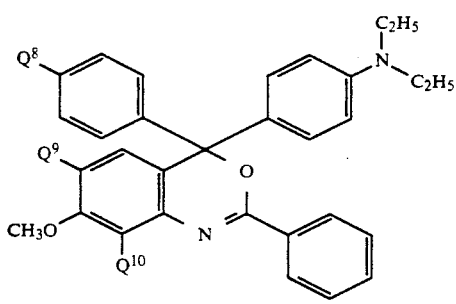

in which $Q^8$ is hydrogen or methoxy,
$Q^9$ is methyl or methoxy and
$Q^{10}$ is hydrogen or
$Q^9$ is hydrogen and
$Q^{10}$ is hydrogen or methoxy; and d) is at least one lactone of the formula

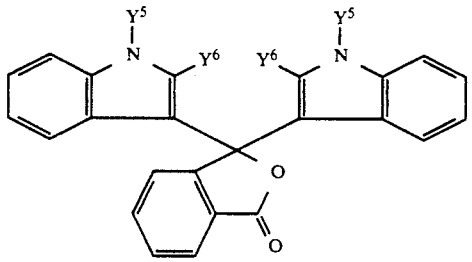

in which
$Y^5$ is methyl, ethyl, butyl or octyl and
$Y^6$ is methyl or ethyl.

5. A mixture of claim 1, in which at least one of the benzoxazine components in a) and c) is a mixture whose components differ with respect to substituents $R^6/R^7$ or $Q^5/Q^6$.

6. A mixture of claim 4, in which at least one of the benzoxazine components in a) and c) is a mixture whose components differ with respect to substituents $R^9/R^{10}$ or $Q^9/Q^{10}$.

7. A mixture of claim 1, in which the mixing ratio of components a), b) and c)+d) is 5-95/3-70/2-70 parts by weight.

8. A mixture of claim 1, in which the mixture contains in weight %, 3-90% of component a), 5-50% of component b) and 4-40% of component c) or d).

9. A mixture of claim 1, which contains more than 50% by weight of component a).

* * * * *

UNITED STATES PATENT AND TRADEMARK OFFICE
CERTIFICATE OF CORRECTION

PATENT NO. : 5,178,670

DATED : January 12, 1993

INVENTOR(S) : Günther Klug, et al.

It is certified that error appears in the above-identified patent and that said Letters Patent is hereby corrected as shown below:

| | |
|---|---|
| Title Page : Item (56): | U.S. PATENT DOCUMENTS: Delete "4,017,480" and substitute -- 5,017,480 -- |
| Column 1, line 47 | Before "one" delete "or" |
| Column 2, line 48 | Delete "Yhu 2" and substitute -- $Y^2$ -- |
| Column 5, line 23 | Delete "(1), 5-50% of (11) and 4-40% of (111)" and substitute -- (I), 5-50% of (II) and 4-40% of (III) -- |
| Column 7, last line | Delete "Colour former (I):" |
| Column 9, line 1 | Insert -- Colour former (I) -- |

UNITED STATES PATENT AND TRADEMARK OFFICE
CERTIFICATE OF CORRECTION

PATENT NO. : 5,178,670
DATED : January 12, 1993
INVENTOR(S) : Günther Klug, et al.

It is certified that error appears in the above-identified patent and that said Letters Patent is hereby corrected as shown below:

Column 12, second formula of Example 11, Delete

" 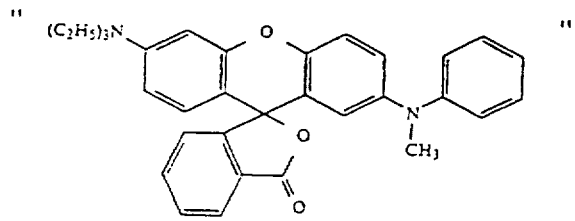 "

and substitute

-- 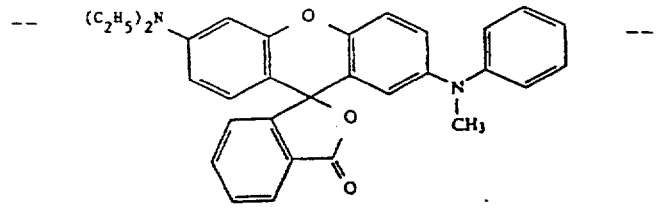 --

UNITED STATES PATENT AND TRADEMARK OFFICE
CERTIFICATE OF CORRECTION

PATENT NO. : 5,178,670

DATED : January 12, 1993

INVENTOR(S) : Günther Klug, et al.

It is certified that error appears in the above-identified patent and that said Letters Patent is hereby corrected as shown below:

Column 13, first formula of Example 15   Delete

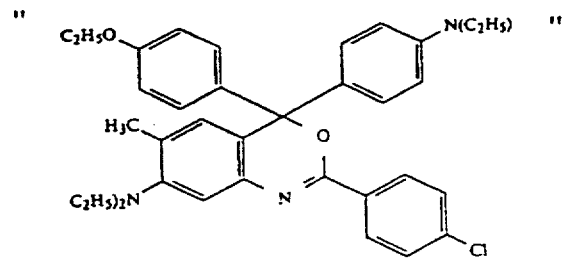

and substitute

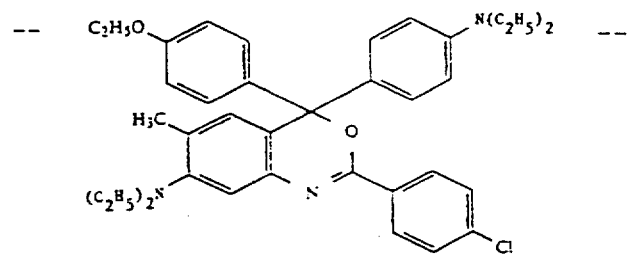

UNITED STATES PATENT AND TRADEMARK OFFICE
CERTIFICATE OF CORRECTION

PATENT NO. : 5,178,670
DATED : January 12, 1993
INVENTOR(S) : Günther Klug, et al.

It is certified that error appears in the above-identified patent and that said Letters Patent is hereby corrected as shown below:

Column 13, last line          Delete "Example 16:"

Column 15, line 1             Insert -- Example 16: --

Column 18, last line          After "c)" insert -- is --

Column 21, line 16            Delete "$X^5$" and substitute -- $X^6$ --

Signed and Sealed this

Seventh Day of June, 1994

Attest:

BRUCE LEHMAN

*Attesting Officer*          Commissioner of Patents and Trademarks